(12) United States Patent
Mikajiri

(10) Patent No.: US 12,501,187 B2
(45) Date of Patent: Dec. 16, 2025

(54) PHOTOELECTRIC CONVERSION APPARATUS, DEVICE, AND MOVING BODY

(71) Applicant: CANON KABUSHIKI KAISHA, Tokyo (JP)

(72) Inventor: Satoru Mikajiri, Gunma (JP)

(73) Assignee: Canon Kabushiki Kaisha, Tokyo (JP)

( * ) Notice: Subject to any disclaimer, the term of this patent is extended or adjusted under 35 U.S.C. 154(b) by 66 days.

(21) Appl. No.: 18/657,503

(22) Filed: May 7, 2024

(65) Prior Publication Data

US 2024/0381000 A1  Nov. 14, 2024

(30) Foreign Application Priority Data

May 10, 2023 (JP) ................. 2023-078040

(51) Int. Cl.
*H04N 25/773* (2023.01)
*H04N 25/76* (2023.01)
*H10F 30/225* (2025.01)

(52) U.S. Cl.
CPC ........... *H04N 25/773* (2023.01); *H04N 25/76* (2023.01); *H10F 30/225* (2025.01)

(58) Field of Classification Search
CPC ...... H04N 25/77; H04N 25/707; H04N 25/76; H04N 5/359; H04N 5/378; H04N 5/374; H04N 25/773; H10F 30/225; G01J 2001/4466; G01J 2001/442; G01J 1/4228; H01L 27/14612; H01L 27/1464; H01L 27/1461; H01L 27/14641; H01L 31/02027; H01L 31/107; G01T 1/248
See application file for complete search history.

(56) References Cited

U.S. PATENT DOCUMENTS

| | | | | |
|---|---|---|---|---|
| 10,833,207 B2* | 11/2020 | Iwata | .................. | G01J 1/44 |
| 10,903,385 B2* | 1/2021 | Miyamoto | ............. | H04N 25/00 |
| 11,089,251 B2* | 8/2021 | Ikedo | ...................... | H10F 77/14 |
| 11,353,563 B2* | 6/2022 | Tsai | ...................... | G01S 17/04 |
| 11,588,995 B2* | 2/2023 | Shinohara | ............ | H10F 30/225 |
| 11,846,542 B2* | 12/2023 | Yamazaki | ............ | H04N 25/773 |
| 2016/0316160 A1 | 10/2016 | Kurokawa | | |
| 2020/0045251 A1* | 2/2020 | Koizumi | ............... | H10F 39/182 |
| 2020/0186735 A1 | 6/2020 | Hizu | | |

FOREIGN PATENT DOCUMENTS

JP   2020096347 A   6/2020
JP   2023059522 A   4/2023

* cited by examiner

*Primary Examiner* — Abdelaaziz Tissire
(74) *Attorney, Agent, or Firm* — Canon U.S.A., Inc. IP Division

(57) ABSTRACT

A photoelectric convertor is provided. The convertor includes first and second pixels each including an avalanche photodiode and a counter, and a processor. The first and second pixels repeat a detection operation including exposure intervals in which the counter counts a number of times that an avalanche breakdown occurred in the photodiode and holding intervals in which a count value counted in the exposure interval is held in the counter. After a predetermined time has elapsed from the start of a first exposure interval of the first pixel, a second exposure interval of the second pixel is started. The processor outputs a difference value between a first count value counted in the first exposure interval and held in the counter in a first holding interval that continues from the first exposure interval and a second count value counted in the second exposure interval.

13 Claims, 14 Drawing Sheets

PHOTOELECTRIC CONVERSION APPARATUS, DEVICE, AND MOVING BODY

BACKGROUND

Technical Field

One disclosed aspect of the embodiments relates to a photoelectric conversion apparatus, a device, and a moving body.

Description of the Related Art

Japanese Patent Laid-Open No. 2020-096347 describes an asynchronous solid-state imaging device that operates in response to detection of an event such as a change in a light amount. In Japanese Patent Laid-Open No. 2020-096347, in response to detection of an event by a detection pixel comprising a typical photodiode in which an avalanche breakdown does not occur, a pixel signal is obtained by counting the number of photons entering an avalanche photodiode (APD) within a predetermined exposure interval in a pixel comprising the APD.

In regards to the configuration described in Japanese Patent Laid-Open No. 2020-096347, it is conceivable to use an APD as a detection pixel and detect an event from a change in the number of photons entering the APD. However, in order to detect a change in the number of photons entering the APD in the detection pixel, a count value in an exposure interval at least one time prior to an exposure interval of interest needs to be held in a memory or the like and compared with the count value in the exposure interval of interest, and the circuit scale of the detection pixel may increase.

SUMMARY

Some embodiments of the disclosure provide a technique that is advantageous in suppressing the circuit scale of a pixel circuit.

According to some embodiments, a photoelectric conversion apparatus includes a plurality of pixels and a processing circuit. The plurality of pixels includes first pixel and second pixel that each include an avalanche photodiode and a counter for counting a number of times that an avalanche breakdown occurred in the avalanche photodiode. In an interval for detecting a change in an amount of light incident on the photoelectric conversion apparatus, the first pixel and the second pixel repeat a detection operation including exposure intervals in which the avalanche photodiode is caused to operate and the counter counts the number of times that an avalanche breakdown occurred and holding intervals in which the operation of the avalanche photodiode is caused to stop and a count value counted in the exposure interval is held in the counter. For the first pixel and the second pixel, the detection operation is started at different timings from each other alternatingly. After a predetermined time has elapsed from the start of a first exposure interval among the exposure intervals of the first pixel, a second exposure interval among the exposure intervals of the second pixel is started. The processing circuit outputs a difference value between a first count value counted in the first exposure interval in the first pixel and held in the counter in a first holding interval among the holding intervals that continues from the first exposure interval and a second count value counted in the second exposure interval in the second pixel.

Further features of the disclosure will become apparent from the following description of exemplary embodiments (with reference to the attached drawings).

DESCRIPTION OF THE EMBODIMENTS

Figure 1:
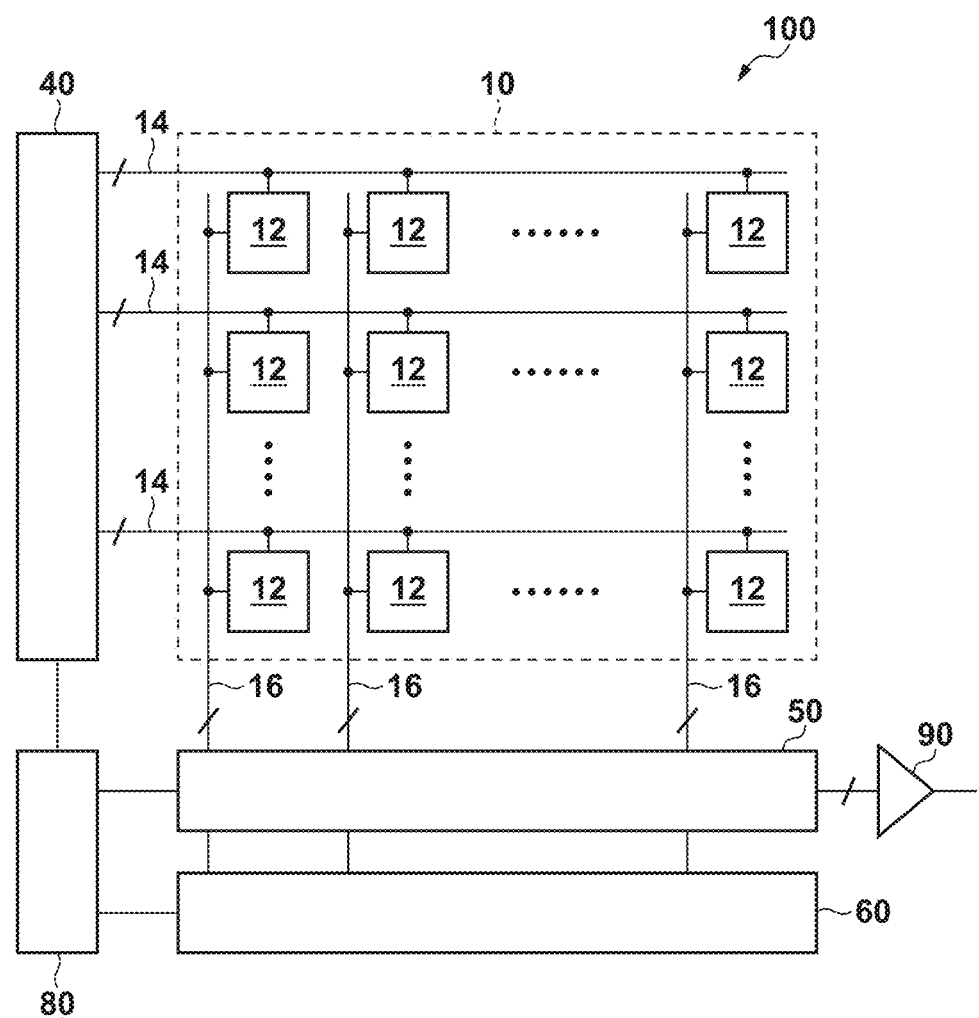
FIG. 1 is a block diagram illustrating an example of a configuration of a photoelectric conversion apparatus according to the present embodiment.

Hereinafter, embodiments will be described in detail with reference to the attached drawings. Note, the following embodiments are not intended to limit the scope of the claimed disclosure. Multiple features are described in the embodiments, but limitation is not made to a disclosure that requires all such features, and multiple such features may be combined as appropriate. Furthermore, in the attached drawings, the same reference numerals are given to the same or similar configurations, and redundant description thereof is omitted.

With reference to FIGS. 1 to 14, a photoelectric conversion apparatus according to an embodiment of the present disclosure will be described. FIG. 1 is a block diagram illustrating a schematic configuration of a photoelectric conversion apparatus 100 according to one embodiment. As illustrated in FIG. 1, the photoelectric conversion apparatus 100 may include a pixel unit or circuit assembly 10, a vertical scanning circuit 40, a read circuit 50, a horizontal scanning circuit 60, a control pulse generation circuit 80, and an output circuit 90. Hereinafter, the photoelectric conversion apparatus 100 will be described as an asynchronous so-called image capturing apparatus including an avalanche photodiode (APD) in a pixel or pixel circuit 12 disposed in the pixel unit 10. However, the photoelectric conversion apparatus of the present embodiment is not limited to this. Examples of the photoelectric conversion apparatus include, in addition to the image capturing apparatus, a distance measuring apparatus (an apparatus that performs distance measurement using focus detection or Time Of Flight (TOF)), a photometric apparatus (an apparatus that performs measurement of an incident light amount, and the like), and the like.

The pixel unit 10 includes a plurality of pixels 12 arranged in an array so as to form a plurality of rows and a plurality of columns. In each pixel 12, as will be described later, a photoelectric conversion unit including an APD that is a photon detection element and a processing circuit that processes a signal outputted from the photoelectric conversion unit may be arranged. The number of pixels 12 constituting the pixel unit 10 is not particularly limited. For example, the pixel unit 10 may be constituted by a plurality of pixels 12 arranged in an array of several thousand rows by several thousand columns, as in a typical digital camera. Further, for example, the pixel unit 10 may be constituted by a plurality of pixels 12 arranged in one row or one column. Further, for example, the pixel unit 10 may be constituted by one pixel 12.

In each row of the pixel array arranged in the pixel unit 10, a control line 14 extending in the row direction (horizontal direction in FIG. 1) is arranged. The control lines 14 are connected to the pixels 12 arranged in the row direction, respectively, and function as signal lines common to the pixels 12 arranged in the row direction. The row direction in which the control lines 14 extend may be referred to as a horizontal direction. The control lines 14 arranged corresponding to the pixels 12 of one row may be constituted by a plurality of signal lines for supplying a plurality of types of control signals to the pixels 12.

In each column of the pixel array arranged in the pixel unit 10, a data line 16 extending in the column direction (vertical direction in FIG. 1) that intersects the row direction is arranged. The data lines 16 are connected to the pixels 12 arranged in the column direction, respectively, and function as signal lines common to the pixels 12 arranged in the column direction. The column direction in which the data lines 16 extend may be referred to as a vertical direction. The data lines 16, which are arranged for each of the pixels 12 in one column, may be constituted by a plurality of signal lines for transferring digital signals of a plurality of bits outputted from the pixels 12 for each bit.

The control lines 14, which are arranged for each of the rows of the pixel array arranged in the pixel unit 10, are connected to the vertical scanning circuit 40. The vertical scanning circuit 40 receives a control signal outputted from the control pulse generation circuit 80, generates a control signal for driving the pixels 12, and supplies the control signal to the pixels 12 via the control lines 14. A logic circuit such as a shift register or an address decoder may be used for the vertical scanning circuit 40. The vertical scanning circuit 40 sequentially scans the pixels 12 arranged in the pixel unit 10 on a row-by-row basis, and outputs pixel signals of the respective pixels 12 to the read circuit 50 via the data lines 16.

The data lines 16, which are arranged for each of the columns of the pixel array arranged in the pixel unit 10, are connected to the read circuit 50. The read circuit 50 includes a plurality of holding circuits (not illustrated) provided corresponding to the respective columns of the pixel array arranged in the pixel unit 10, and has a function of holding the pixel signals of the pixels 12 outputted from the pixel unit 10 on a row-by-row basis via the data lines 16 by the holding circuits of the corresponding columns.

The horizontal scanning circuit 60 receives a control signal outputted from the control pulse generation circuit 80, generates a control signal for reading out a pixel signal from the holding circuit of each column arranged in the read circuit 50, and supplies the control signal to the read circuit 50. A logic circuit such as a shift register or an address decoder may be used for the horizontal scanning circuit 60. The horizontal scanning circuit 60 sequentially scans the holding circuit of each of the columns arranged in the read circuit 50, and sequentially outputs the pixel signals held in the respective columns to the output circuit 90.

The output circuit 90 has an external interface circuit and is a circuit for outputting the pixel signal outputted from the read circuit 50 to outside of the photoelectric conversion apparatus 100. The external interface circuit included in the output circuit 90 is not particularly limited. The external interface circuit may be constituted by, for example, a Serializer/Deserializer (SerDes) transmitting circuit. The SerDes transmitting circuit may be, for example, a Low Voltage Differential Signaling (LVDS) circuit or a Scalable Low Voltage Signaling (SLVS) circuit.

The control pulse generation circuit 80 generates control signals for controlling the operation and the timing of the operation of the vertical scanning circuit 40, the read circuit 50, and the horizontal scanning circuit 60, and supplies the control signals to the vertical scanning circuit 40, the read circuit 50, and the horizontal scanning circuit 60. Configuration may be such that not all of the control signals for controlling the operation of the vertical scanning circuit 40, the read circuit 50, and the horizontal scanning circuit 60 and the timing of the operation are supplied from the control pulse generation circuit 80. Configuration may be such that some or all of the control signals for controlling the operation of the vertical scanning circuit 40, the read circuit 50, and the horizontal scanning circuit 60 and for controlling the timing of the operations are supplied from outside of the photoelectric conversion apparatus 100.

Figure 2:
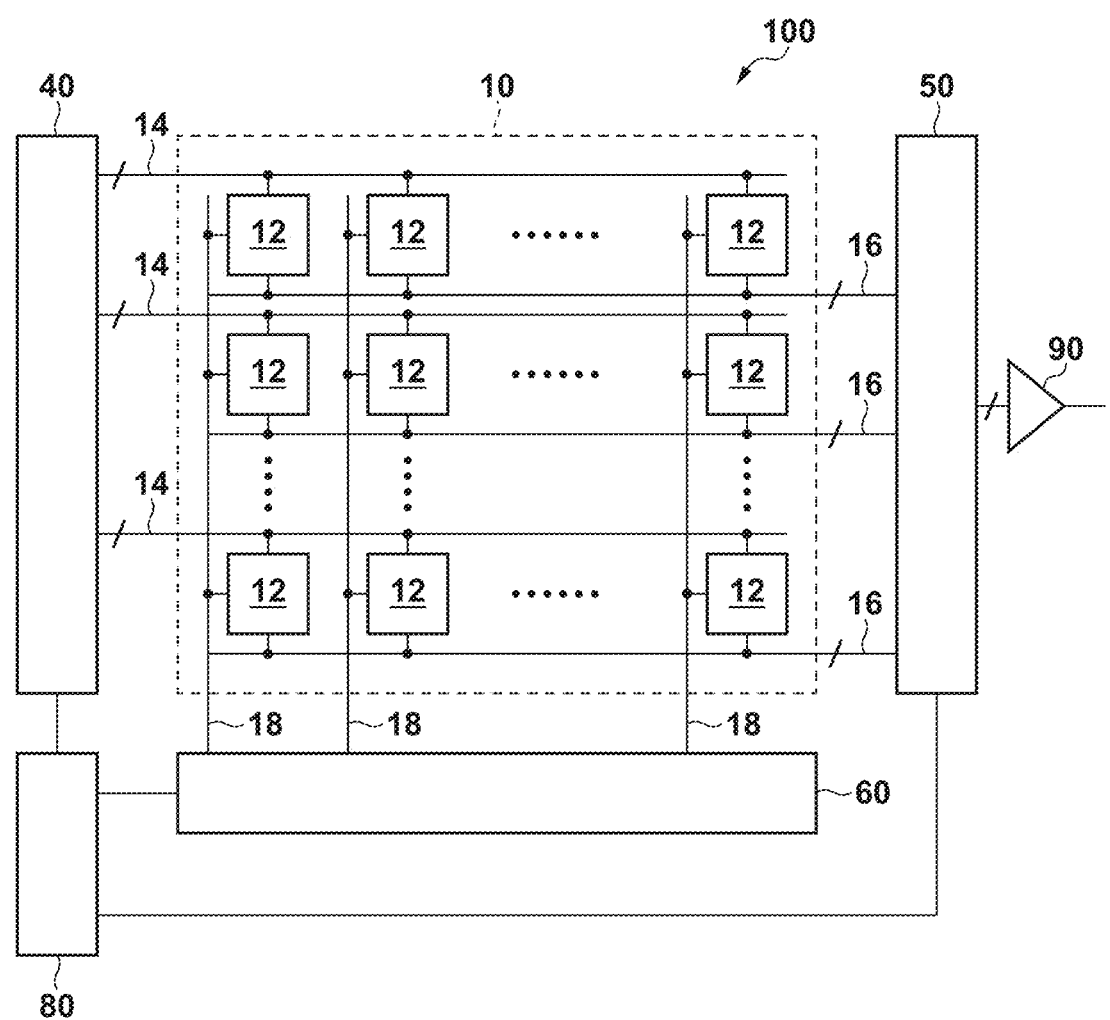
FIG. 2 is a diagram illustrating a modification of the photoelectric conversion apparatus of FIG. 1.

Here, connection forms of each of the functional blocks such as the vertical scanning circuit 40, the read circuit 50, the horizontal scanning circuit 60, the control pulse generation circuit 80, and the output circuit 90 disposed in the photoelectric conversion apparatus 100 are not limited to those of the configuration example illustrated in FIG. 1. For example, each functional block arranged in the photoelectric conversion apparatus 100 may have a configuration as illustrated in FIG. 2. In the configuration example illustrated in FIG. 2, the data lines 16 extending in the row direction are arranged in each row of the pixel array arranged in the pixel unit 10. The data lines 16 are connected to the pixels 12 arranged in the row direction, respectively, and function as signal lines common to the pixels 12 arranged in the row direction. A control line 18 extending in the column direction is arranged in each column of the pixel array arranged in the pixel unit 10. The control lines 18 are connected to the pixels 12 arranged in the column direction, respectively, and function as signal lines common to the pixels 12 arranged in the column direction.

The control lines 18, which are arranged for each of the columns of the pixel array arranged in the pixel unit 10, are connected to the horizontal scanning circuit 60. The horizontal scanning circuit 60 receives a control signal outputted from the control pulse generation circuit 80, generates a control signal for reading a pixel signal from the pixels 12, and supplies the control signal to the pixels 12 via the control line 18. Specifically, the horizontal scanning circuit 60 sequentially scans a plurality of pixels 12 of the pixel unit 10 on a column-by-column basis, and the pixel signals of the pixels 12 of each row arranged in the selected column are outputted to the data lines 16.

The data lines 16, which are arranged for each of the rows of the pixel array arranged in the pixel unit 10, are connected to the read circuit 50. The read circuit 50 includes a plurality of holding circuits (not illustrated) provided for the respective rows of the pixel array arranged in the pixel unit 10, and holds the pixel signals of the pixels 12 of each row outputted from the pixel unit 10 on a column-by-column basis via the data lines 16 in the holding circuits of the corresponding rows.

The read circuit 50 receives the control signal outputted from the control pulse generation circuit 80, and sequentially outputs the pixel signals held in the holding circuit of each row to the output circuit 90. Other configurations in the configuration example illustrated in FIG. 2 may be similar to the configuration example illustrated in FIG. 1.

Figure 3:
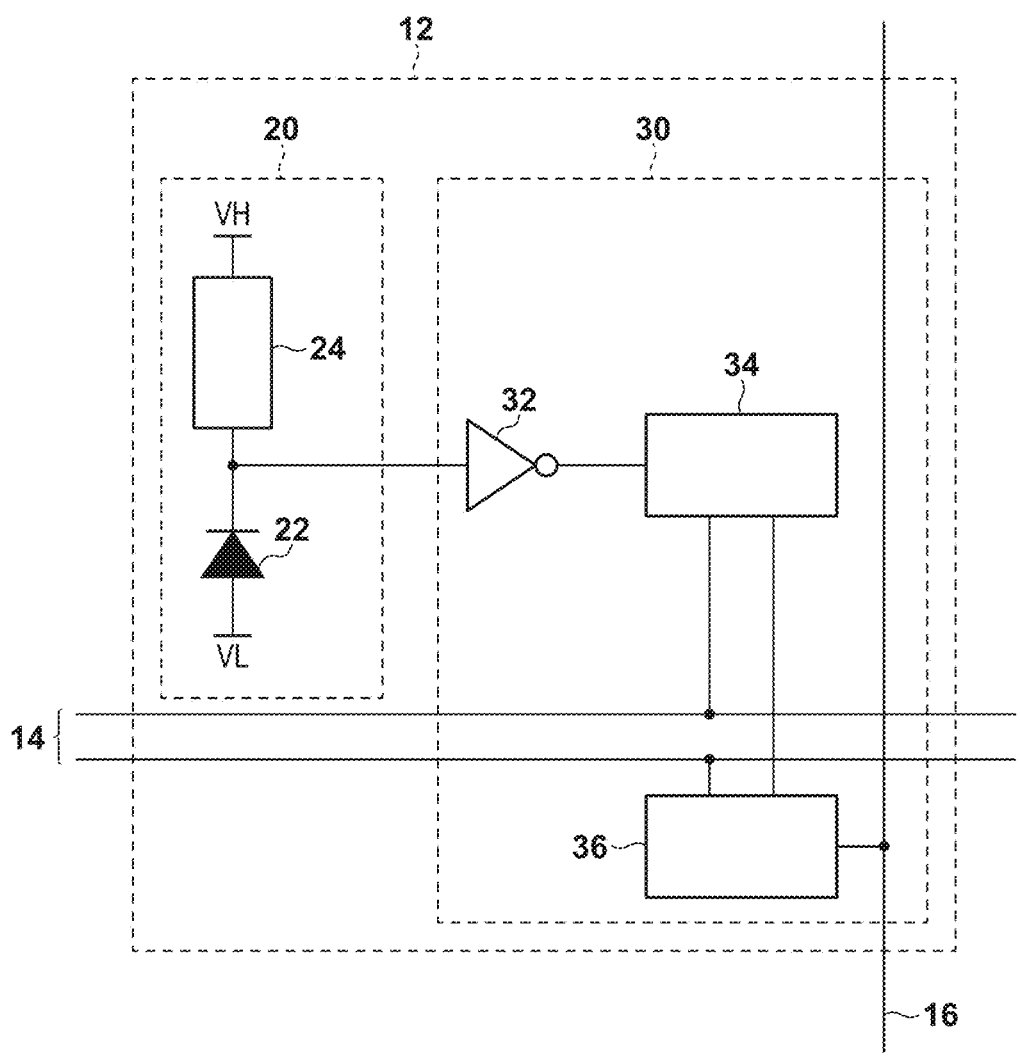
FIG. 3 is a block diagram illustrating an example of a configuration of a pixel of the photoelectric conversion apparatus of FIG. 1.

As illustrated in FIG. 3, the pixels 12 disposed in the pixel unit 10 may include a photoelectric conversion unit 20 and a pixel signal processing unit 30. The photoelectric conversion unit 20 may include a photon detection element 22 and a quench element 24. The pixel signal processing unit 30 may include a waveform shaping circuit 32, a digital processing circuit 34, and a pixel output circuit 36.

For example, an avalanche photodiode (APD) may be used as the photon detection element 22. The anode of the APD serving as the photon detection element 22 is connected to a node to which a potential VL is supplied. The cathode of the APD is connected to one of the two terminals of the quench element 24. A connection node between the photon detection element 22 and the quench element 24 is an output node of the photoelectric conversion unit 20. Among the two terminals of the quench element 24, the terminal to which the cathode of the APD is not connected is connected to a node to which a potential VH which is higher than the potential VL is supplied. The potential difference (or voltage) between the potential VL and the potential VH is set such that a sufficient reverse-bias voltage is applied for an avalanche multiplication operation to occur in the APD serving as the photon detection element 22. For example, a negative high potential may be supplied as the potential VL, and a positive potential of the level of the power supply potential may be supplied as the potential VH. For example, −30V may be supplied as the potential VL, and 1V may be supplied as the potential VH.

The photon detection element 22 may be constituted by the APD as described above. When the APD is supplied with a reverse-bias voltage sufficient for the avalanche multiplication operation, an avalanche breakdown occurs due to the light incidence on the APD, and an avalanche multiplication current is generated. Operation modes in a state in which the reverse-bias voltage is supplied to the APD include a Geiger mode and a linear mode. The Geiger mode is an operation mode in which the voltage applied between the anode and the cathode is a reverse-bias voltage that is greater than the breakdown voltage of the APD. The linear mode is an operation mode in which the voltage applied between the anode and the cathode is a reverse-bias voltage that is in the vicinity of or less than the breakdown voltage of the APD. An APD operating in Geiger mode is also referred to as a Single Photon Avalanche Diode (SPAD). The APD constituting the photon detection element 22 may operate in the linear mode or may operate in the Geiger mode.

The quench element 24 has a function for converting a change in current when an avalanche breakdown occurs in the photon detection element 22 into a voltage signal. The quench element 24 functions as a load circuit (quench circuit) at the time of current multiplication due to avalanche breakdown, and has a function of suppressing avalanche breakdown by reducing a voltage applied to the photon detection element 22. The operation in which the quench element 24 suppresses avalanche breakdown is referred to as a quench operation. In addition, the quench element 24 has a function of returning the potential supplied to the photon detection element 22 to the potential VH by supplying a current corresponding to the voltage drop according to the quench operation. An operation by which the quench element 24 returns the potential supplied to the photon detection element 22 to the potential VH is referred to as a recharge operation. The quench element 24 may be constituted by a resistive element, a Metal Oxide Semiconductor (MOS) (or Metal Insulator Semiconductor (MIS)) transistor, or the like. In the present embodiment, as will be described later, a transistor is used as the quench element 24.

The waveform shaping circuit 32 includes an input node to which the output signal of the photoelectric conversion unit 20 is supplied, and an output node. The waveform shaping circuit 32 has a function of converting an analog signal supplied from the photoelectric conversion unit 20 into a pulse signal. As illustrated in FIG. 3, the waveform shaping circuit 32 may be constituted by an inverter circuit or the like. The output node of the waveform shaping circuit 32 is connected to the digital processing circuit 34.

The digital processing circuit 34 includes an input node to which the output signal of the waveform shaping circuit 32 is supplied, an input node connected to the control line 14, and an output node. The digital processing circuit 34 includes a counter to be described later. The counter has a function of counting pulses to be superimposed on the signal outputted from the waveform shaping circuit 32 and holding a count value as a result of the counting. The signal supplied from the vertical scanning circuit 40 to the digital processing circuit 34 via the control line 14 may include a timer clock signal or the like for controlling a pulse count interval (exposure interval). An output node of the digital processing circuit 34 is connected to the data line 16 via the pixel output circuit 36.

The pixel output circuit 36 has a function of switching an electrical connection state (connected or disconnected) between the digital processing circuit 34 and the data line 16. The pixel output circuit 36 switches the connection state between the digital processing circuit 34 and the data line 16 in accordance with a control signal supplied from the vertical scanning circuit 40 via the control line 14 (in the case of the configuration example illustrated in FIG. 2, the control signal supplied from the horizontal scanning circuit 60 via the control line 18). The pixel output circuit 36 may include a buffer circuit or the like for outputting a signal.

The pixel 12 is typically a unit structure that outputs a pixel signal for forming an image. However, the pixel 12 does not necessarily need to be a unit structure for outputting a pixel signal for forming an image when the purpose is to measure a distance using a TOF method or the like. That is, the pixel 12 may be a unit structure that outputs a signal for measuring a time when light arrives and the amount of light.

The pixel signal processing unit 30 does not necessarily need to be provided for each pixel 12, and one pixel signal processing unit 30 may be provided for a plurality of pixels 12. In this case, signal processing of the plurality of pixels 12 can be sequentially performed using one pixel signal processing unit 30.

Figure 4:
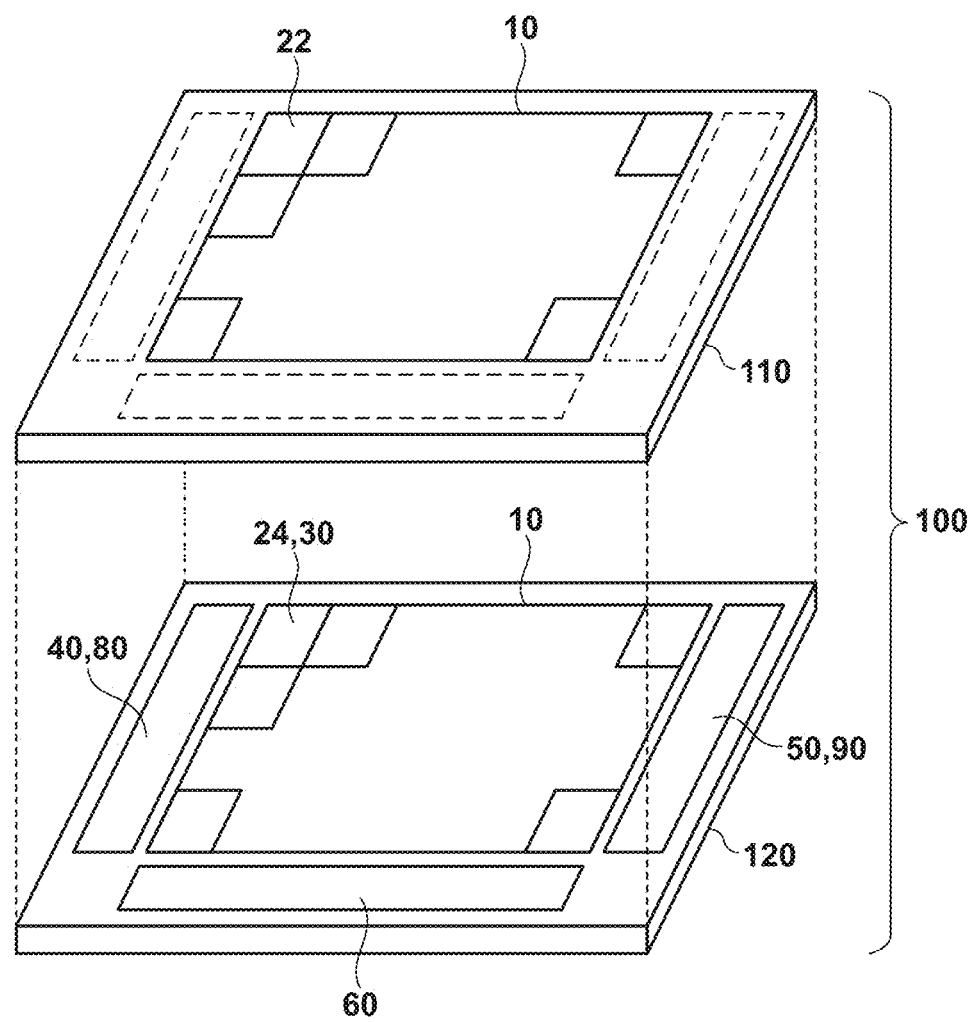
FIG. 4 is a perspective view illustrating an example of a configuration of the photoelectric conversion apparatus of FIG. 1.

The photoelectric conversion apparatus 100 may be formed on one substrate. Further, for example, the photoelectric conversion apparatus 100 may be configured as a stacked photoelectric conversion apparatus in which a plurality of substrates are stacked. In the latter case, for example, as illustrated in FIG. 4, the photoelectric conversion apparatus 100 can be configured as a stacked photoelectric conversion apparatus in which a sensor substrate 110 and a circuit substrate 120 are stacked and electrically connected. At least the photon detection element 22 among the constituent elements of the pixel 12 may be arranged on the sensor substrate 110. Further, the quench element 24 and the pixel signal processing unit 30 among the constituent elements of the pixel 12 may be arranged in the circuit substrate 120. The photon detection element 22 disposed on the sensor substrate 110 and the quench element 24 and the pixel signal processing unit 30 disposed on the circuit substrate 120, for example, may be electrically connected via a connection wiring provided for each pixel 12. The circuit substrate 120 may further include the vertical scanning circuit 40, the read circuit 50, the horizontal scanning circuit 60, the control pulse generation circuit 80, the output circuit 90, and the like.

In the stacked photoelectric conversion apparatus 100, the photon detection element 22, the quench element 24 and the pixel signal processing unit 30 disposed in one pixel 12 may be disposed on the sensor substrate 110 and the circuit substrate 120 so as to overlap in an orthographic projection with respect to the light incident surface of the sensor substrate 110. The vertical scanning circuit 40, the read circuit 50, the horizontal scanning circuit 60, the control pulse generation circuit 80, the output circuit 90, and the like may be disposed around the pixel unit 10 which is formed by the plurality of pixels 12.

The stacked photoelectric conversion apparatus 100 can improve the degree of integration of elements, and as a result, can achieve an improvement in functionality. In particular, by arranging the photon detection element 22, and the quench element 24 and the pixel signal processing unit 30 on separate substrates, the photon detection element 22 can be arranged at high density without sacrificing the light receiving area of the photon detection element 22. Thereby, the photon detection efficiency can be improved. The number of substrates constituting the photoelectric conversion apparatus 100 is not limited to two. Three or more substrates may be stacked to form the photoelectric conversion apparatus 100.

In the configuration illustrated in FIG. 4, chips diced from a wafer are assumed for the sensor substrate 110 and the circuit substrate 120, but the sensor substrate 110 and the circuit substrate 120 are not limited to chips. For example, each of the sensor substrate 110 and the circuit substrate 120 may be a wafer. The sensor substrate 110 and the circuit substrate 120 may be stacked in a wafer state and then diced, or may be stacked and bonded after each of them is formed into a chip.

Figure 5A:
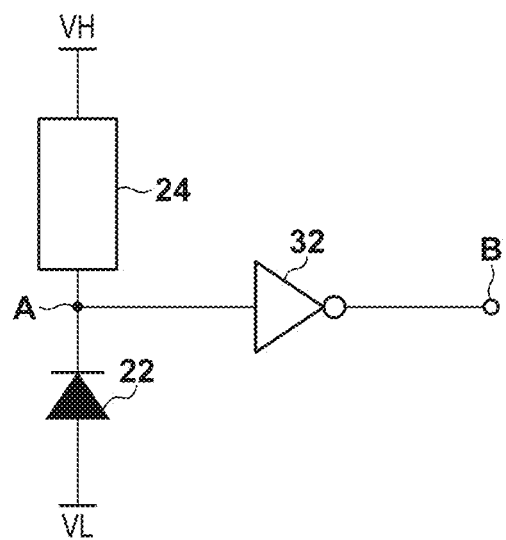
FIGS. 5A and 5B are diagrams illustrating an operation of the photoelectric conversion apparatus of FIG. 1.
Figure 5B:
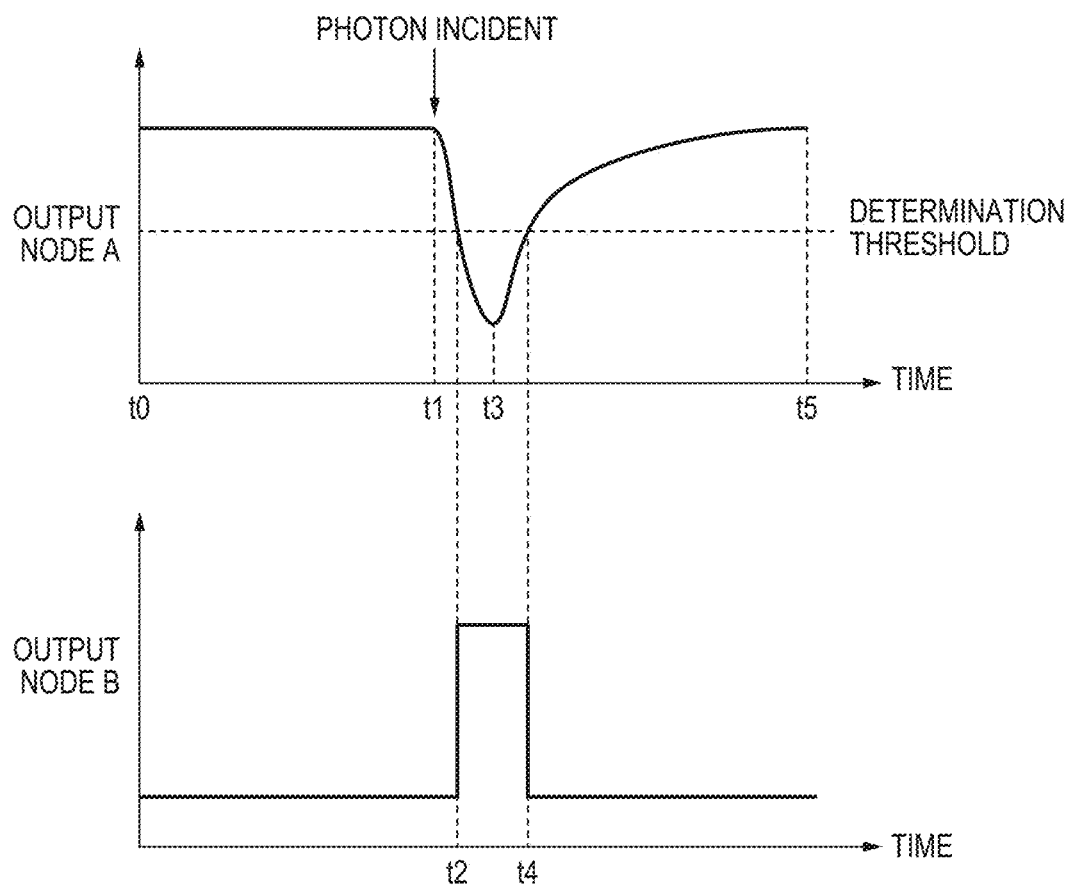

FIGS. 5A and 5B are diagrams for explaining the basic operations of the photoelectric conversion unit 20 and the waveform shaping circuit 32. FIG. 5A is a circuit diagram of the photoelectric conversion unit 20 and the waveform shaping circuit 32. FIG. 5B illustrates the waveform of the signal of the input node (node A) of the waveform shaping circuit 32 and the waveform of the signal of the output node (node B) of the waveform shaping circuit 32. Here, for the sake of simplification of the description, a case where the waveform shaping circuit 32 is constituted by an inverter circuit is illustrated.

At the time t0, a reverse-bias voltage having a potential difference corresponding to the potential VH–potential VL is applied to the photon detection element 22. Between the anode and the cathode of the APD constituting the photon detection element 22, a reverse-bias voltage sufficient for avalanche breakdown to occur when a photon is incident is applied, but when no photon is incident on the photon detection element 22, there is no carrier to seed an avalanche breakdown. Therefore, no avalanche breakdown occurs in the photon detection element 22, and no current flows in the photon detection element 22.

It is assumed that a photon enters the photon detection element 22 at the subsequent time t1. When the photon enters the photon detection element 22, electron-hole pairs are generated by photoelectric conversion, avalanche breakdown occurs seeded by these carriers, and an avalanche multiplication current flows through the photon detection element 22. The avalanche multiplication current flows through the quench element 24, and thereby a voltage drop due to the quench element 24 occurs, and the voltage at the node A starts to drop. When the voltage drop of the node A becomes large and the avalanche breakdown stops at time t3, the voltage level of the node A does not drop any further.

When the avalanche breakdown in the photon detection element 22 stops, a current that compensates for the voltage drop flows from the node to which the potential VL is supplied to the node A via the photon detection element 22, and the potential of the node A gradually increases. Then, at time t5, the node A settles at its original potential level.

The waveform shaping circuit 32 binarizes the signal inputted from the node A in accordance with a predetermined determination threshold and outputs the binarized signal from the node B. Specifically, the waveform shaping circuit 32 outputs a low-level signal from the node B when the potential level of the node A exceeds a determination threshold, and outputs a high-level signal from the node B when the potential level of the node A is equal to or lower than the determination threshold. For example, as illustrated in the FIG. 5B, it is assumed that the potential level of the node A is equal to or lower than the determination threshold in the time interval from the time t2 to the time t4. In this case, the signal level at the node B is a low level in an interval from the time t0 to the time t2 and an interval from the time t4 to the time t5, and is a high level in an interval from the time t2 to the time t4.

Thus, the analog signal input from the node A is waveform-shaped into a digital signal by the waveform shaping circuit 32. The pulse signal outputted from the waveform shaping circuit 32 in response to the incidence of photons on the photon detection element 22 is a photon detection pulse signal.

Figure 6:
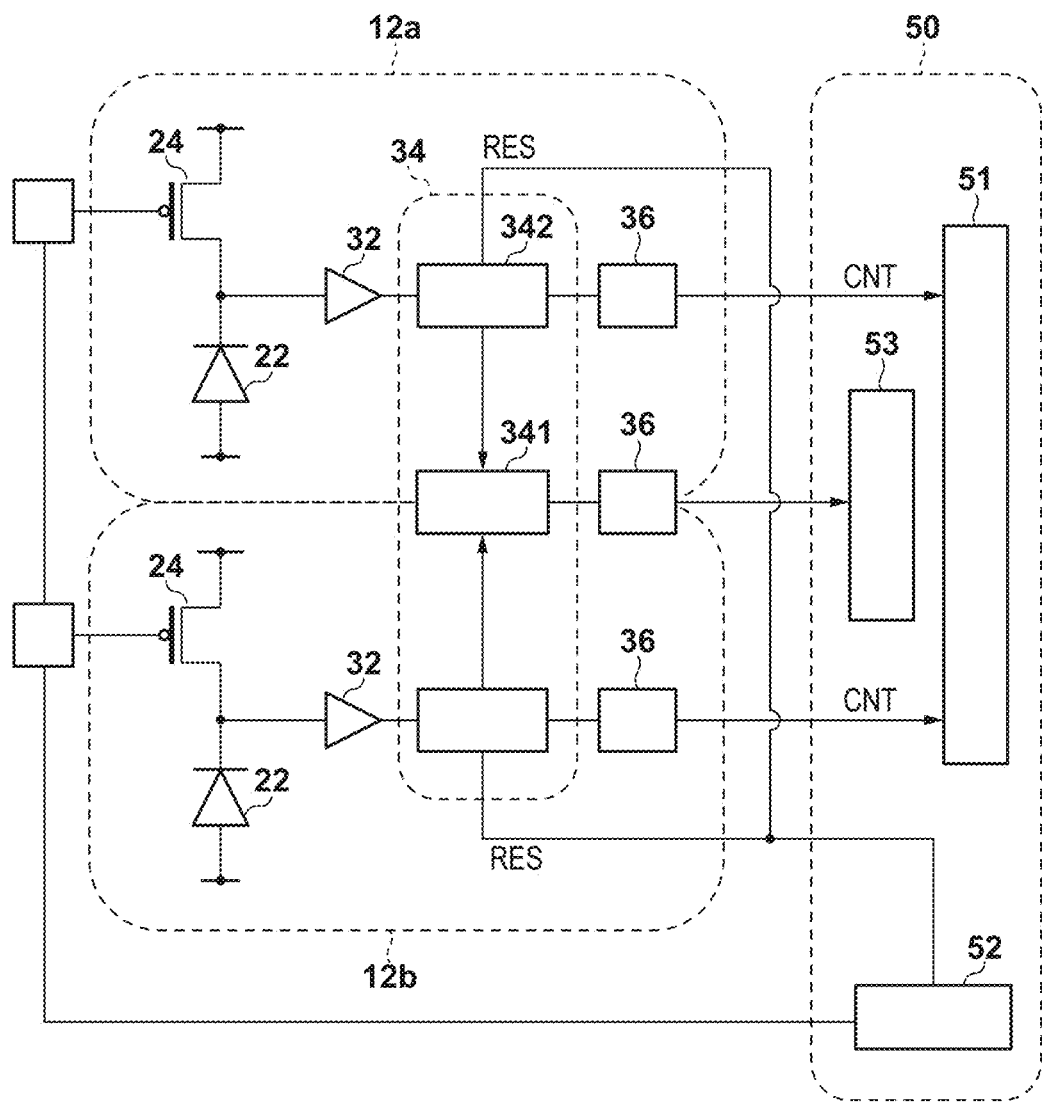
FIG. 6 is a block diagram illustrating an example of a configuration of a pixel of the photoelectric conversion apparatus of FIG. 1.

FIG. 6 is a diagram for explaining the configuration of the pixel 12 in the present embodiment in more detail. In the description of FIG. 6, the description of portions overlapping with FIG. 3 and FIG. 5 will be omitted or simplified as appropriate. In the configuration illustrated in FIG. 6, as one example, two pixels 12a, 12b are made to be one group. The read circuit 50 further includes a pixel read circuit 51, a difference value read circuit 53, and an exposure control circuit 52. The digital processing circuit 34 includes a counter 342 and a processing circuit 341.

As described above, the counter 342 counts pulses based on the photons incident on the photon detection element 22, and holds a count value that is a result of the count. It can be said that the counter 342 counts the number of times avalanche breakdown has occurred in the APD serving as the photon detection element 22. The counter 342 includes, for example, flip-flops as a bit memory capable of holding a digital signal of a plurality of bits to hold a count value. The count value held in the counter 342 is outputted to the data line 16 as the count value CNT via the pixel output circuit 36. The count value held in the counter 342 can also be outputted to the processing circuit 341. In addition, the counter 342 resets the count value held at a timing corresponding to the pulse of a reset signal RES inputted from the exposure control circuit 52 to an initial value.

The processing circuit 341 calculates a difference value between the count value inputted from the counter 342 arranged in the pixel 12a and the counter 342 arranged in the pixel 12b, and outputs the result to the difference value read circuit 53 via the pixel output circuit 36. The processing circuit 341 may be a digital circuit configured to perform a difference calculation process based on a digital signal count value.

Figure 7:
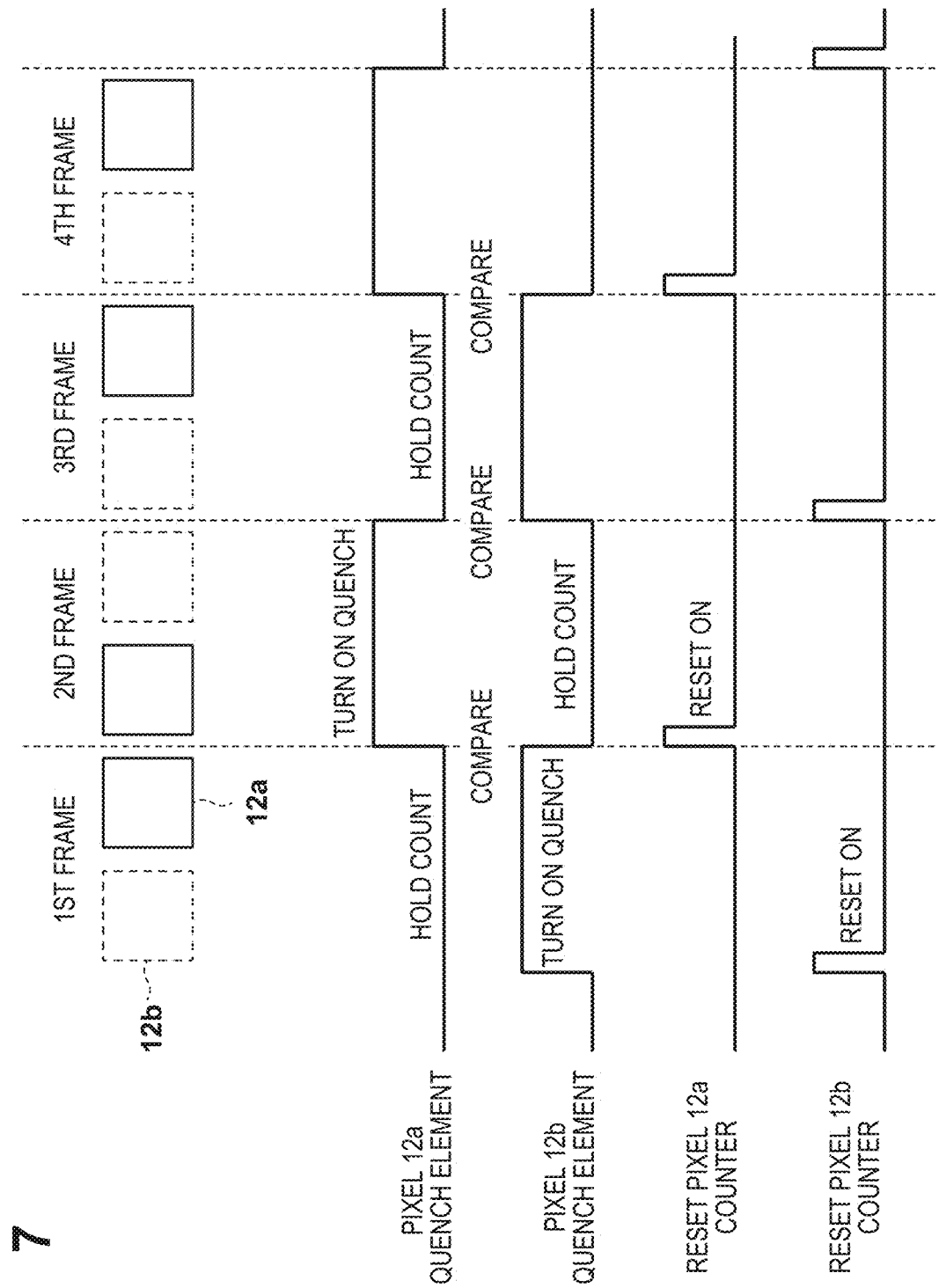
FIG. 7 is a timing diagram illustrating an example of driving of a pixel of the photoelectric conversion apparatus of FIG. 1.

FIG. 7 is a timing diagram illustrating an operation of the pixels 12a, 12b. During an interval for detecting a change in the amount of light entering the photoelectric conversion apparatus 100, the pixels 12a, 12b repeat a detection operation including: an exposure interval in which the APD serving as the photon detection element 22 is operated and the number of avalanche breakdowns is counted by the counter 342; and a holding interval in which the APD operation is stopped and the count value counted in the exposure interval is held in the counter 342. The pixel 12a and the pixel 12b alternatingly start this detection operation at different timings to each other.

For example, in the second frame illustrated in FIG. 7, the quench element 24 (transistor) arranged in the pixel 12a is turned on, so that the APD operates and the exposure interval is entered. On the other hand, in the pixel 12b, the operation of the APD is stopped by turning off operation of the quench element 24 and a holding interval is entered. Therefore, the counter 342 arranged in the pixel 12b holds the count value counted in the first frame, which is the exposure interval of the pixel 12b. As described above, after the lapse of a predetermined time from the start of the exposure interval of the first frame illustrated in FIG. 7 among the exposure intervals of the pixel 12b, the exposure interval of the second frame illustrated in FIG. 7 among the exposure intervals of the pixel 12a is started. The processing circuit 341 outputs a difference value between the count value of the exposure interval of the first frame of the pixel 12b held in the counter 342 in the holding interval of the second frame subsequent to the first exposure interval of the first frame, which was counted in the exposure interval of the first frame in the pixel 12b, and the count value counted in the exposure interval of the second frame in the pixel 12a. For example, a difference value between the count value of the second frame of the pixel 12a and the count value of the first frame held in the pixel 12b is calculated by the processing circuit 341 at a timing at which the exposure interval of the pixel 12a ends.

When the quench element 24 is turned off without resetting the counter 342 arranged in the pixel 12a at the timing at which the calculation of the difference value in the processing circuit 341 ends, the exposure interval ends and the counter 342 continues to hold the count value in the holding interval of the third frame. Meanwhile, in the pixel 12b, when the third frame is reached, the count value of the counter 342 is reset in response to the start of the exposure interval in which the quench element 24 is turned on, and the count of the number of avalanche breakdowns of the APD serving as the photon detection element 22 is started. By repeating such a detection operation, it is possible to continuously acquire the difference value of the count value between the pixel 12a and the pixel 12b, that is, the amount of change between the frames in the count value of photons that enter. By the change in the count value, it is possible to detect a change in the amount of light incident on the photoelectric conversion apparatus 100. For example, a detection circuit that detects a change in the amount of incident light based on the difference value may be arranged in the difference value read circuit 53. Further, for example, a difference value may be output from the photoelectric conversion apparatus 100, and a change in the amount of incident light may be detected externally to the photoelectric conversion apparatus 100.

Figure 8:
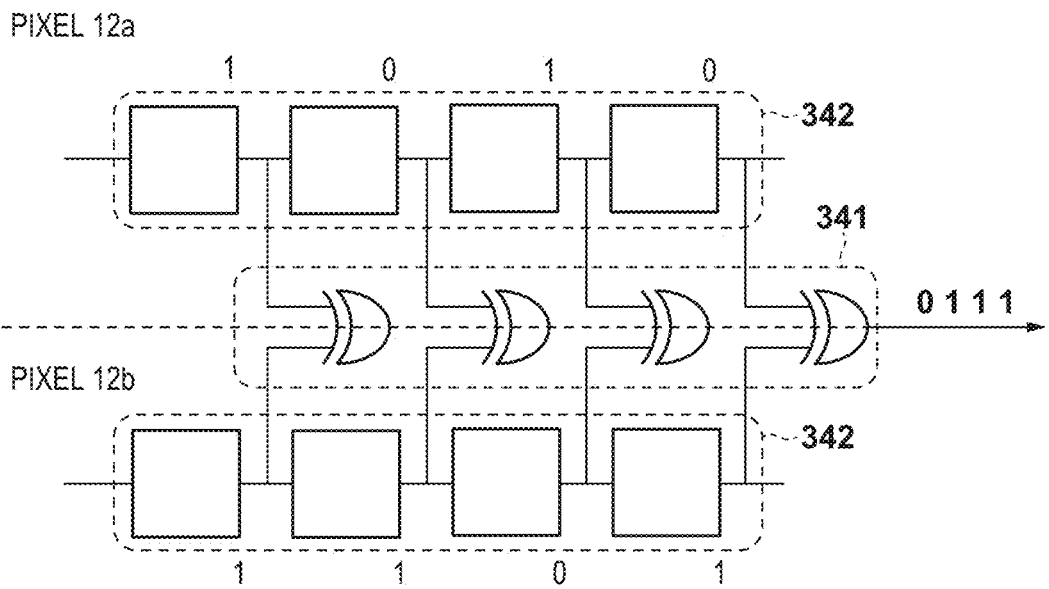
FIG. 8 is a diagram illustrating an example of a configuration of a counter of a pixel of the photoelectric conversion apparatus of FIG. 1.

FIG. 8 illustrates an example of a logic circuit of the processing circuit 341 for acquiring a difference value between the count values of the counters 342 of the pixel 12a and the pixel 12b. As described above, the counter 342 includes a flip-flop circuit. The processing circuit 341 may include an exclusive OR circuit that obtains an exclusive OR of the count value held in the flip-flop circuit of the pixel 12a and the count value held in the flip-flop circuit of the pixel 12b for each digit. Thereby, the difference value between each digit of the count values held in the counters 342 can be extracted. For example, when the detection circuit arranged in the difference value read circuit 53 outputs "1 (count value changed)" from a digit higher than a certain digit, it may be determined that an event in which the amount of incident light changed has occurred.

The length of the exposure interval of the pixel 12a and the length of the exposure interval of the pixel 12b may be the same as illustrated in FIG. 7. In this case, for both an event in which the amount of light incident on the photoelectric conversion apparatus 100 increases and an event in which the amount of light decreases, the processing circuit 341 acquires the difference value using the same operation, and the detection circuit can determine that the event has occurred using the same threshold value. That is, the circuit configuration can be simplified. However, the disclosure is not limited thereto, and the length of the exposure interval of the pixel 12a and the length of the exposure interval of the pixel 12b may be different from each other. In this case, for example, the processing circuit 341 may be provided with a correction circuit or the like that corrects at least one of the count values according to the lengths of the exposure intervals of the pixel 12a and the pixel 12b.

Figure 9:
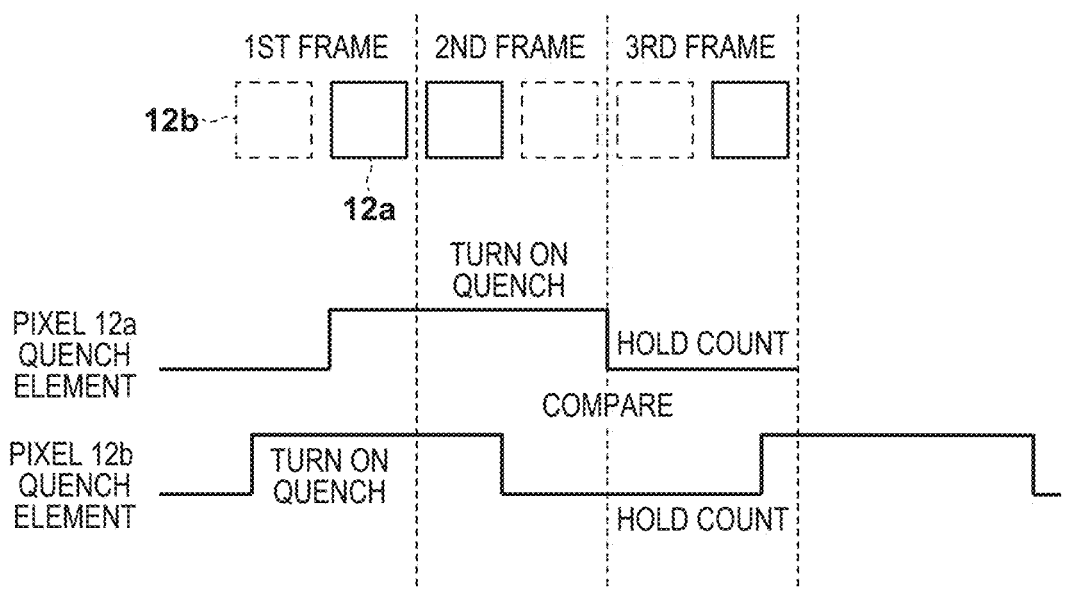
FIG. 9 is a timing diagram illustrating an example of driving of a pixel of the photoelectric conversion apparatus of FIG. 1.

As illustrated in FIG. 7, configuration may be such that the exposure interval of the pixel 12a and the exposure interval of the pixel 12b do not overlap each other. However, the disclosure is not limited thereto, and as illustrated in FIG. 9, the exposure interval of the pixel 12a and the exposure interval of the pixel 12b may partially overlap with each other. When the exposure intervals are overlapped, the probability that an event will be missed is reduced.

Figure 10:
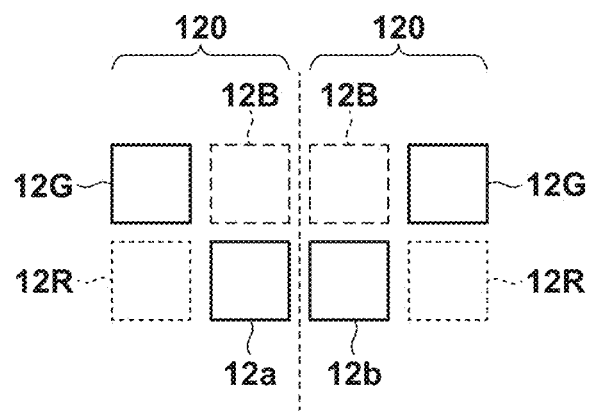
FIG. 10 is a block diagram illustrating an example of an arrangement of a pixel of the photoelectric conversion apparatus of FIG. 1.

Although the above description has focused on the pixels 12a, 12b, the pixel unit 10 may further include, for example, a pixel 12R sensitive to red, a pixel 12R sensitive to green, and a pixel 12B sensitive to blue in order to acquire color images. For example, pixels 12a (12b), 12R, 12G, and 12B for detecting a change in the incident light amount described above may be made to be one group 120. In this case, for example, as illustrated in FIG. 10, groups 120 adjacent to each other in the horizontal direction may be arranged so as to be left/right flipped, and the pixel 12a and the pixel 12b, which are event pixels for detecting a change in the amount of light, may be arranged so as to be adjacent to each other. The pixels 12R, 12G, 12B may have the same configuration as that of the pixels 12a, 12b. For example, in the pixels 12R, 12G, 12B, the APD may function as a SPAD. In addition, configuration may be such that the processing circuit 341 is not disposed in the pixels 12R, 12G, 12B. Further, for example, among the pixels 12R, 12G, 12B that are adjacent to each other, the processing circuit 341 may be arranged in the same manner as in the relationship between the pixel 12a and the pixel 12b, and may be used for detecting an event.

Here, methods for detecting events from the difference values of the counted values of the pixels 12a, 12b between frames acquired by the processing circuit 341 are described. An "event" means that a change in the amount of light incident on the photon detection element 22 of the pixels 12a, 12b satisfies a predetermined condition. The predetermined condition may be, for example, that the difference value of the count value exceeds a predetermined threshold value, or that the amount of change in the count value exceeds a predetermined threshold value. As described above, the detection of the event may be performed by, for example, a detection circuit arranged in the difference value read circuit 53, or the difference value may be output to the outside of the photoelectric conversion apparatus 100 and the detection of the event performed outside the photoelectric conversion apparatus 100.

Figure 11:
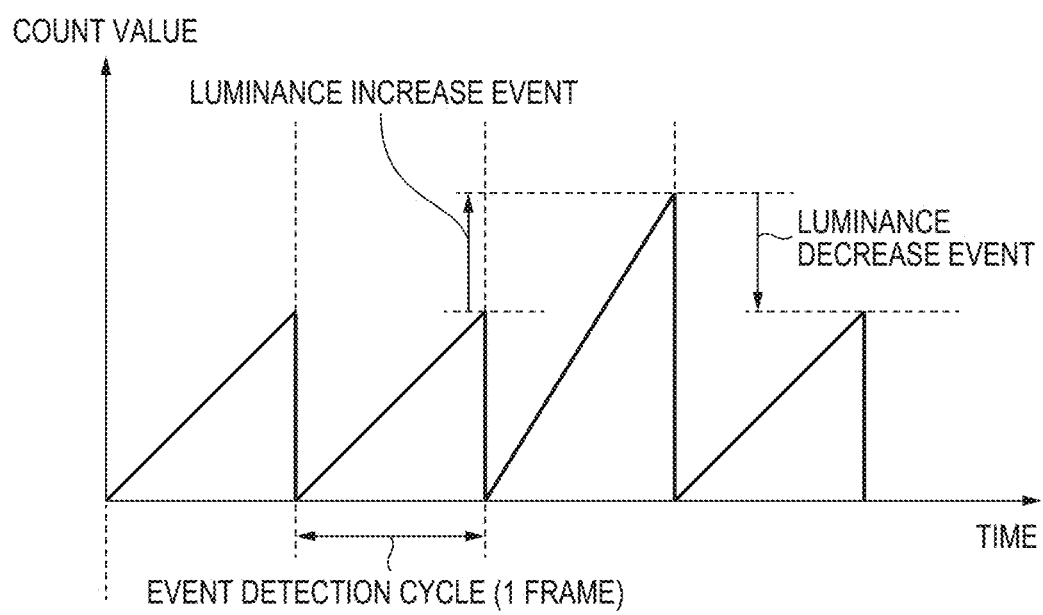
FIG. 11 is a timing diagram illustrating an example of driving of a pixel of the photoelectric conversion apparatus of FIG. 1.

FIG. 11 is an example of detecting an event in response to the difference value of the count value exceeding a predetermined threshold value. As illustrated in FIG. 11, the counters 342 arranged in pixel 12a and pixel 12b for each frame count photons incident within a frame interval alternatingly. As described above, the difference value of the count value is acquired for each frame, and is detected as an event when the difference value exceeds a predetermined threshold. For example, the photoelectric conversion apparatus 100 may have a function of causing the state of the pixel 12 to transition in response to detection of an event. For example, the photoelectric conversion apparatus 100 may start imaging using each pixel 12 in response to detection of an event.

In order to detect a change (or an event) in the amount of incident light using one pixel 12, a memory that stores a count value acquired in a frame before the frame of interest, a memory controller, or the like is required for the frame of interest. For example, for the groups 120 constituted by the four pixels 12 illustrated in FIG. 10, it is necessary to arrange one memory for eight pixels 12. That is, the circuit scale of the pixel circuit increases. On the other hand, in the present embodiment, by using two pixels 12a, 12b, the processing circuit 341 can be configured by adding a small-scale circuit such as an exclusive OR circuit. That is, it is possible to detect an event while suppressing an increase in the circuit scale of the pixel circuit. In addition, the pixels 12a, 12b used for detecting an event may have a similar configuration to that of the pixels 12R, 12G, 12B or the like. In other words, since the pixels 12a, 12b for detecting an event do not need to have a configuration that differs from that of the other pixels, the degree of freedom in designing the pixel unit 10 is improved.

Figure 12:
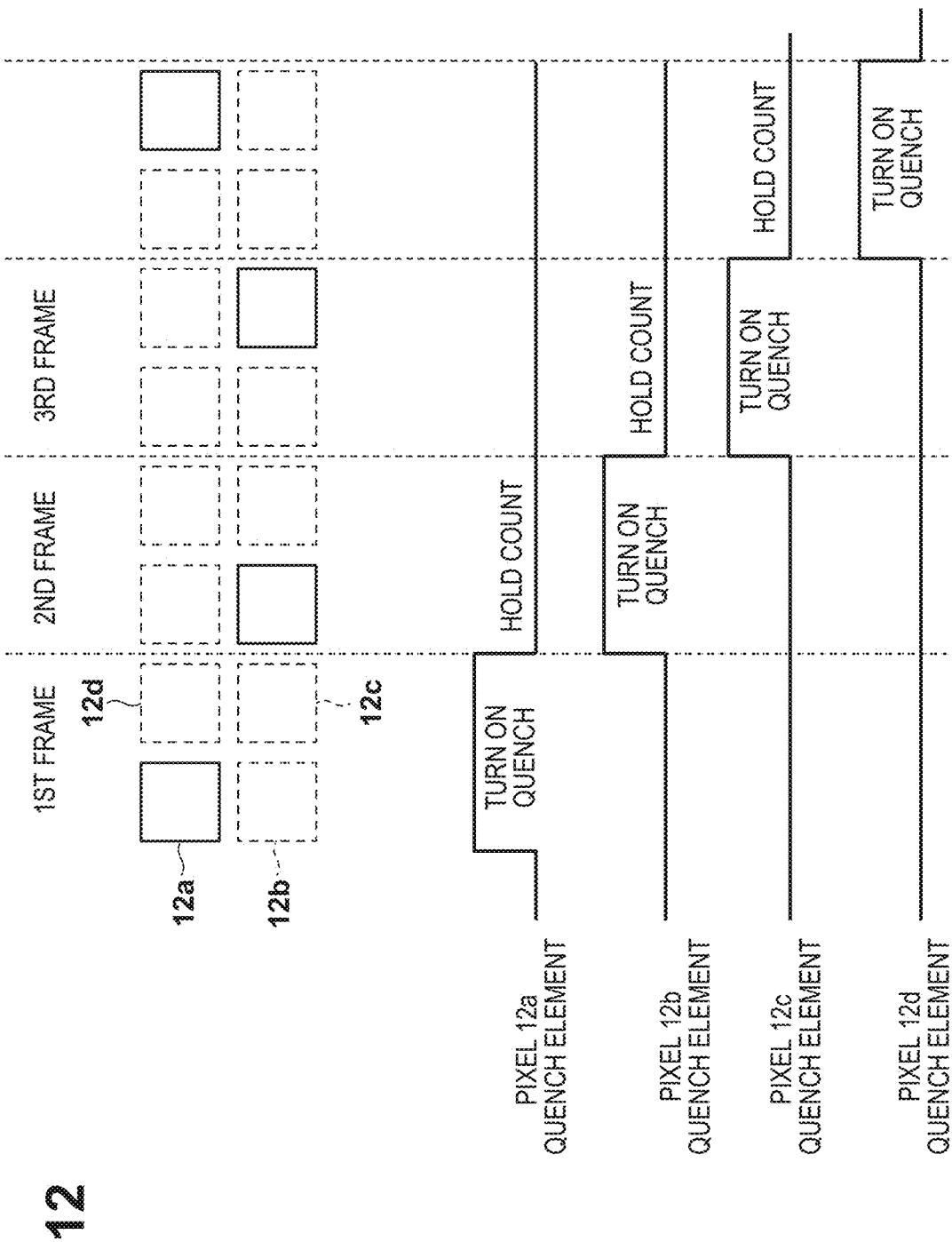
FIG. 12 is a timing diagram illustrating an example of driving of a pixel of the photoelectric conversion apparatus of FIG. 1.

In the above description, it has been described that two pixels 12a, 12b are used to obtain a difference for detecting a change in the amount of incident light. However, the detection of the change in the amount of incident light is not limited to being performed by a group of two pixels 12a, 12b only. Three or more pixels 12 may be used to detect changes in the amount of incident light. FIG. 12 illustrates an example of detecting a change in the amount of incident light using four pixels 12a to 12d.

The pixels 12a to 12d start the above-described detection operation including the exposure interval and the holding interval in a predetermined order at different timings. In each of the pixels 12a to 12d, the number of photons entering the exposure interval per frame is counted, and then the count is held. In the case of the configuration illustrated in FIG. 12, count values for up to four frames in the past can be held. In this case, there is no limitation to only acquiring a difference value between the pixels 12 adjacent to each other in the exposure interval, as with a difference value between the counted values of the pixel 12a and the pixel 12b. For example, in addition to a difference value between adjacent frames, an irregular difference value, such as a difference value between the count values of the pixel 12a and the pixel 12d and a difference value between the count values of the pixel 12b and the pixel 12d can be obtained. In addition, FIG. 12 illustrates an example where the exposure intervals of the respective pixels 12a to 12d do not overlap with each other. However, there is no limitation thereto, and the exposure interval of the pixel 12a and the exposure interval of the pixel 12b, the exposure interval of the pixel 12b and the exposure interval of the pixel 12c, and the exposure interval of the pixel 12c and the exposure interval of the pixel 12d may overlap each other, respectively. An interval in which the exposure interval is overlapped between the pixels 12 can be longer than when the two pixels 12a, 12b described above are used. This reduces the probability of event information where the amount of incident light changes being missed.

Figure 13:
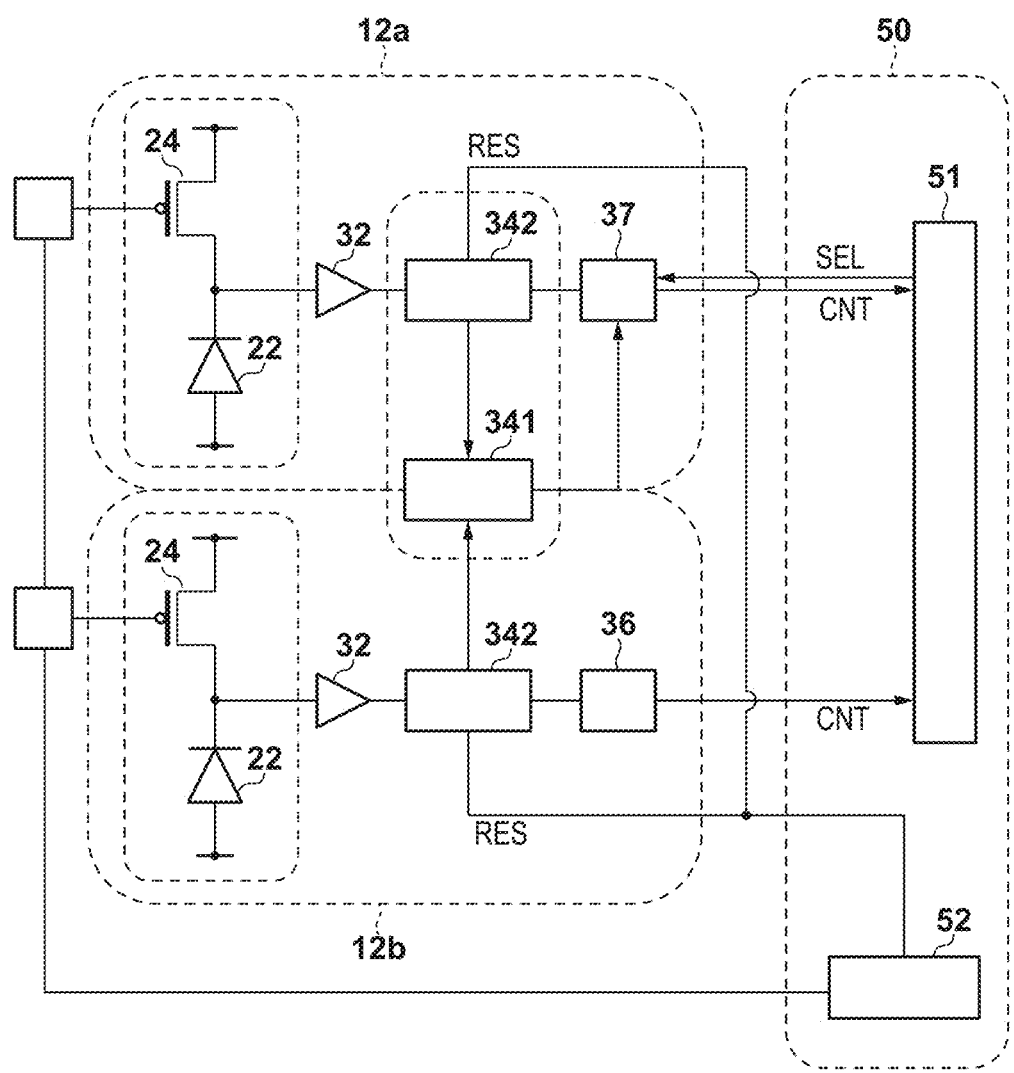
FIG. 13 is a block diagram illustrating an example of a configuration of a pixel of the photoelectric conversion apparatus of FIG. 1.
Figure 14:
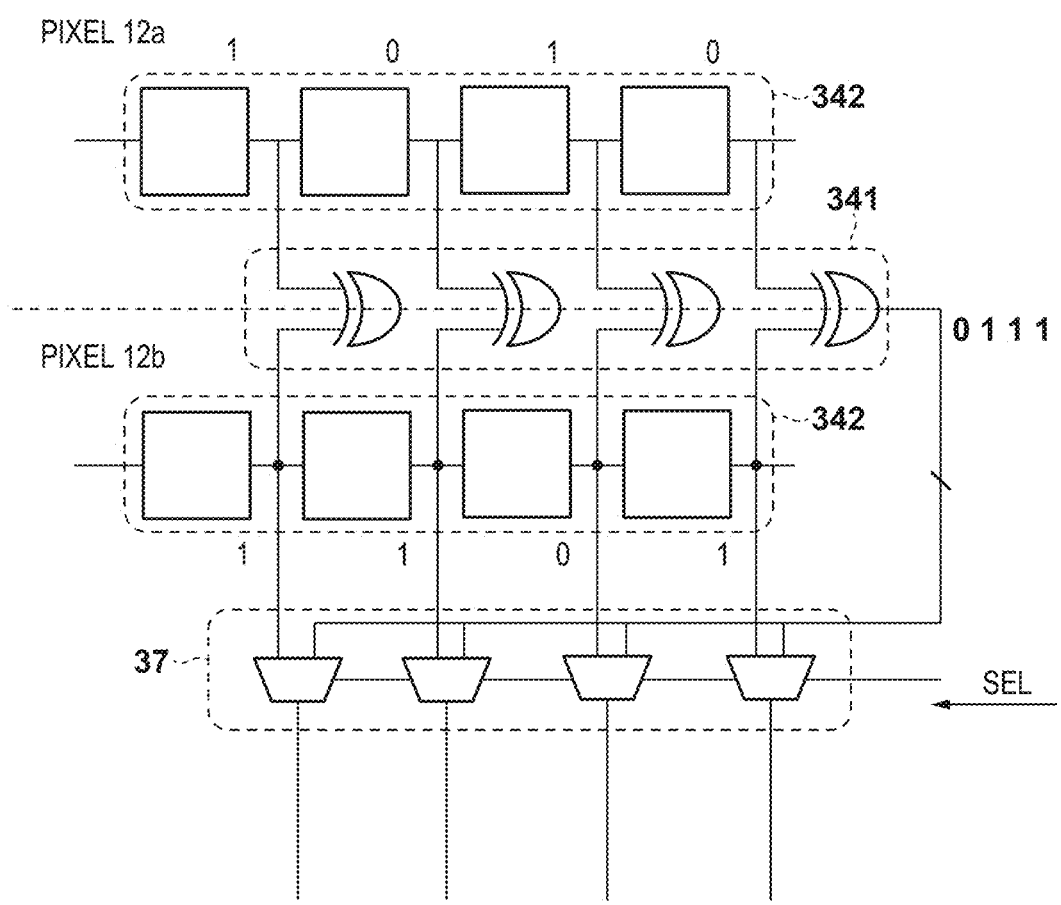
FIG. 14 is a block diagram illustrating an example of a configuration of a pixel of the photoelectric conversion apparatus of FIG. 1.

Referring to FIG. 13 and FIG. 14, a specific example of switching operation of the photoelectric conversion apparatus 100 when an event such as a change in the amount of incident light is detected is illustrated. FIG. 13 is a diagram illustrating a modification of the configuration of the photoelectric conversion apparatus 100 illustrated in FIG. 6. In FIG. 6, in the read circuit 50, the pixel read circuit 51 for reading out a signal for generating an image or the like outputted from the plurality of pixels 12 arranged in the pixel unit 10, and the difference value read circuit 53 for reading out a difference value between counted values of pixels 12a, 12b used for detecting an event are arranged as separate configurations. In contrast, in the read circuit 50 of FIG. 13, the image generation signal and the difference value between the count values of the pixels 12a, 12b are read out to the pixel read circuit 51. Therefore, in the configuration illustrated in FIG. 13, the pixel read circuit 51 of the read circuit 50 can also function as a detection circuit that detects a change in the amount of incident light based on the difference value of the counted values of the pixels 12a, 12b.

Further, in the photoelectric conversion apparatus 100, a switching circuit 37 that is connected to the counter 342 and the processing circuit 341 and that switches the output of the counter 342 and the output of the processing circuit 341 to be outputted to the pixel read circuit 51 of the read circuit 50 is arranged. When the function of the detection circuit included in the pixel read circuit 51 detects a change in the amount of incident light, the pixel read circuit 51 transmits a selection signal SEL to the switching circuit 37, and switches the signal read out by the pixel read circuit 51 between the difference value between the pixel 12a and the pixel 12b and the count value of the counters 342 respectively arranged in the pixels 12.

FIG. 14 illustrates an example of the switching circuit 37, which switches between the difference value outputted from the processing circuit 341 and the count value outputted from the counter 342. In the configuration illustrated in FIG. 14, the output of the counter 342 and the output of the processing circuit 341 can be switched by using a multiplexer circuit in response to the selection signal SEL. For example, after a change (event) in the amount of incident light is detected, the APD is operated as a SPAD in each pixel 12 including the pixels 12a, 12b. That is, in the exposure control according to the exposure control circuit 52, rather than the alternating operation of the pixel 12a and the pixel 12b, an operation of continuing exposure for a desired time in all the pixels 12, for example, can be performed. As a result, an operation for sequentially reading the count values counted by the counters 342 arranged in the pixels 12 including the pixels 12a, 12b can be switched to, and a signal for generating an image can be obtained. In the present embodiment, the pixels 12a, 12b arranged to detect a change (event) in the amount of incident light can also perform an operation of generating a signal for generating an image. Therefore, the image quality of the obtained image can be improved as compared with a case where the pixels 12a, 12b are used only for detecting an event and the pixel values of the pixels 12a, 12b are complemented using the pixel values of the other pixels 12 in the generation of the image.

Figure 15:
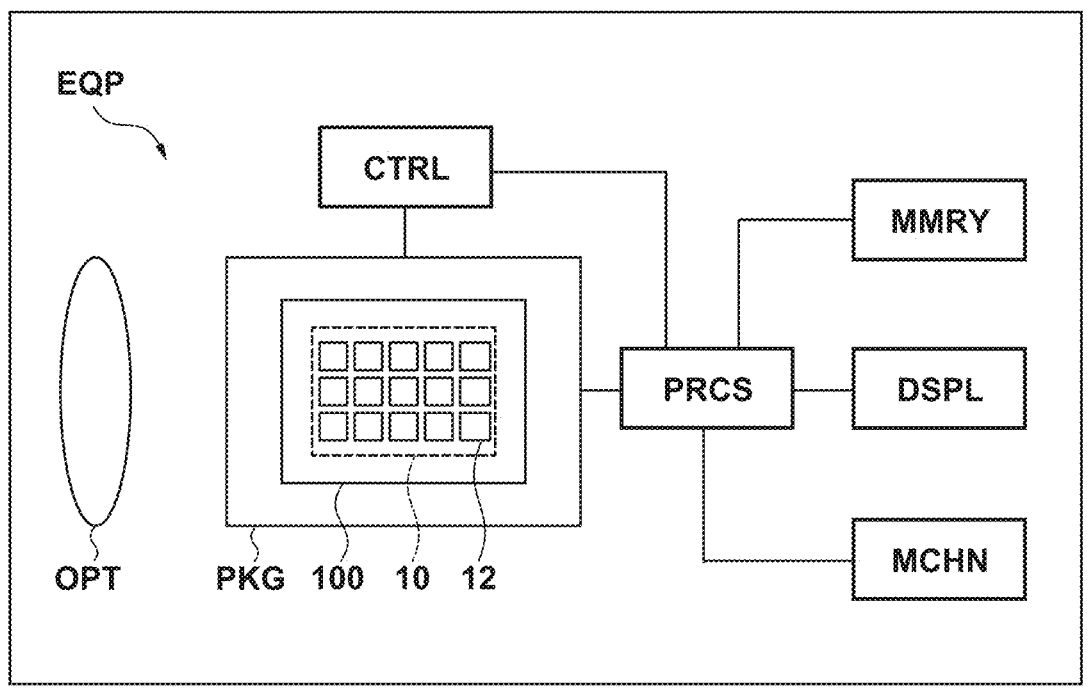
FIG. 15 is a diagram illustrating a configuration example of a device in which the photoelectric conversion apparatus of the present embodiment is incorporated.

Hereinafter, a device EQP including the photoelectric conversion apparatus 100 illustrated in FIG. 15 will be described as an application of the photoelectric conversion apparatus 100. The device EQP may also be referred to as an electronic device. FIG. 15 illustrates a camera as an example of the device EQP. Here, the concept of the camera includes not only an apparatus mainly intended for photographing but also an apparatus (for example, a portable terminal such as a personal computer or a smartphone) supplementarily provided with an image capturing function.

The photoelectric conversion apparatus 100 may be a semiconductor chip having a stacked structure in which the pixel unit 10 is provided. As illustrated in FIG. 15, the photoelectric conversion apparatus 100 is housed in a semiconductor package PKG. The package PKG may include a base body to which the photoelectric conversion apparatus 100 is fixed, a lid body such as glass opposite to the photoelectric conversion apparatus 100, and a conductive connecting member such as a bonding wire or a bump that connects a terminal provided on the base body and a terminal provided on the photoelectric conversion apparatus 100. The device EQP may further include at least one of an optical system OPT, a control apparatus CTRL, a processing apparatus PRCS, a display apparatus DSPL, and a storage apparatus MMRY.

The optical system OPT forms an image on the photoelectric conversion apparatus 100, and may be, for example, a lens, a shutter, and a mirror. The control apparatus CTRL controls the operation of the photoelectric conversion apparatus 100, and may be, for example, a semiconductor device such as an Application Specific Integrated Circuit (ASIC). The processing apparatus PRCS functions as a signal processing unit that processes a signal outputted from the photoelectric conversion apparatus 100, and may be a semiconductor device such as a Central Processing Unit (CPU) or an ASIC. The display apparatus DSPL may be an Electro Luminescent (EL) display apparatus or a liquid crystal display apparatus that displays image data obtained by the photoelectric conversion apparatus 100. The storage apparatus MMRY is a magnetic device or a semiconductor device that stores image data obtained by the photoelectric conversion apparatus 100. The storage apparatus MMRY may be a volatile memory such as a Static Random Access Memory (SRAM) or a Dynamic Random Access Memory (DRAM), or a non-volatile memory such as a flash memory or a hard disk drive. A mechanical apparatus MCHN has moving parts such as a motor or an engine or a propulsion unit. The mechanical apparatus MCHN in the camera can drive the components of the optical system OPT for zooming, focusing, and shutter operation. In the device EQP, the image data outputted from the photoelectric conversion apparatus 100 is displayed on the display apparatus DSPL or transmitted to the outside by a communication apparatus (not illustrated) included in the device EQP. Therefore, the device EQP may include the storage apparatus MMRY and the processing apparatus PRCS.

The camera in which the photoelectric conversion apparatus 100 is incorporated can also be applied to a surveillance camera, an in-vehicle camera mounted on a transport device such as an automobile, a railway vehicle, a ship, an aircraft, or an industrial robot, or the like. In addition, the camera in which the photoelectric conversion apparatus 100 is incorporated can be applied not only to a transportation apparatus but also widely to devices that use object recognition, such as an intelligent transportation system (ITS).

Figure 16A:
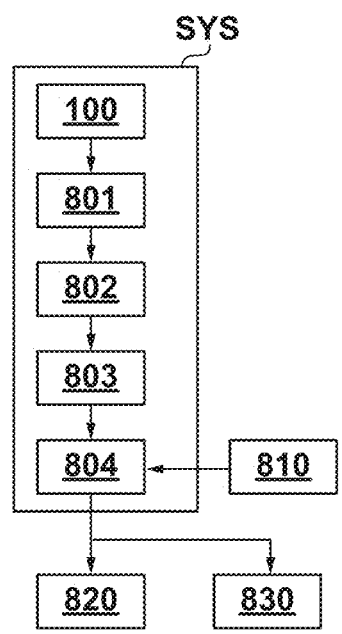
FIGS. 16A and 16B are diagrams illustrating a configuration example of a moving body in which the photoelectric conversion apparatus of the present embodiment is incorporated.
Figure 16B:
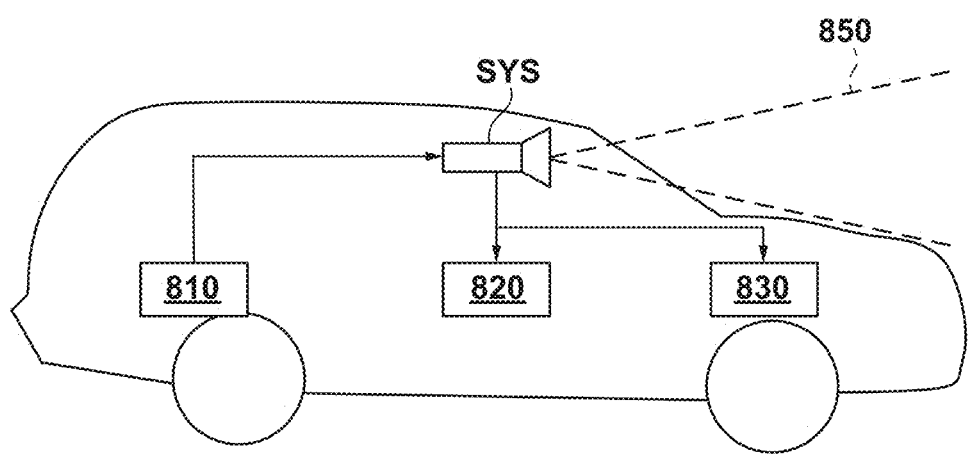

Next, specific applications in which the photoelectric conversion apparatus 100 of the present embodiment is mounted on a moving body will be described with reference to FIGS. 16A and 16B. FIG. 16A illustrates an example of an in-vehicle camera-related photoelectric conversion system. The photoelectric conversion system SYS includes the above-described photoelectric conversion apparatus 100. The photoelectric conversion system SYS includes an image processing unit 801 that performs image processing on a plurality of pieces of image data acquired by the photoelectric conversion apparatus 100, and a parallax acquisition unit 802 that calculates a parallax (a phase difference of a parallax image) from the plurality of pieces of image data acquired by the photoelectric conversion system SYS. Further, the photoelectric conversion system SYS includes a distance acquisition unit 803 that calculates a distance to an object based on the calculated parallax, and a collision determination unit 804 that determines whether or not there is a possibility of collision based on the calculated distance. Here, the parallax acquisition unit 802 and the distance acquisition unit 803 are examples of distance information acquisition means for acquiring distance information on a distance to an object. That is, the distance information is information related to parallax, a defocus amount, a distance to an object, and the like. The collision determination unit 804 may determine the possibility of collision by using any of these pieces of distance information. The distance information acquisition means may be realized by dedicated hardware or by a software module. Further, it may be realized by a Field Programmable Gate Array (FPGA), an ASIC, or the like, or a combination thereof.

The photoelectric conversion system SYS is connected to a vehicle information acquisition apparatus 810, and can obtain vehicle information such as a vehicle speed, a yaw rate, and a steering angle. In addition, the photoelectric conversion system SYS is connected to a control ECU 820 that is a control apparatus that outputs a control signal for generating a braking force on the vehicle based on the determination by the collision determination unit 804. The photoelectric conversion system SYS is also connected to an alarm apparatus 830 that issues an alarm to the driver based on the determination made by the collision determination unit 804. For example, when the collision determination unit 804 determines that there is a high possibility of collision, the control ECU 820 performs vehicle control to avoid collision and reduce damage by braking, returning an accelerator, suppressing engine output, and the like. The alarm apparatus 830 emits an alarm such as a sound, displays alarm information on a screen of a car navigation system or the like, and gives a warning to a user by vibrating a seat belt or a steering wheel.

In the present embodiment, the surroundings, for example, the front or the rear of the vehicle are imaged by the photoelectric conversion system SYS. FIG. 16B illustrates a photoelectric conversion system for capturing an image of a front side of a vehicle (an image capturing range 850). The vehicle information acquisition apparatus 810 sends an instruction to the photoelectric conversion system SYS or the photoelectric conversion apparatus 100. With such a configuration, it is possible to further improve the accuracy of distance measurement.

In the above description, an example of controlling so as not to collide with another vehicle has been described; however, the disclosure is not limited thereto, and may be applied to, for example, a control for performing automatic driving following another vehicle or a control for performing automatic driving so as not to protrude from a lane.

According to the disclosure, it is possible to provide a technique which is advantageous in suppressing a circuit scale of a pixel circuit.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-078040, filed May 10, 2023, which is hereby incorporated by reference herein in its entirety.

What is claimed is:

1. A photoelectric conversion apparatus comprising:
   a plurality of pixels including first pixel and second pixel that each comprise an avalanche photodiode and a counter for counting a number of times that an avalanche breakdown occurred in the avalanche photodiode; and
   a processing circuit,
   wherein in an interval for detecting a change in an amount of light incident on the photoelectric conversion apparatus,
   the first pixel and the second pixel repeat a detection operation including exposure intervals in which the avalanche photodiode is caused to operate and the counter counts the number of times that an avalanche breakdown occurred and holding intervals in which the operation of the avalanche photodiode is caused to stop and a count value counted in the exposure interval is held in the counter,
   for the first pixel and the second pixel, the detection operation is started at different timings from each other alternatingly, and
   after a predetermined time has elapsed from the start of a first exposure interval among the exposure intervals of the first pixel, a second exposure interval among the exposure intervals of the second pixel is started, and
   the processing circuit outputs a difference value between a first count value counted in the first exposure interval in the first pixel and held in the counter in a first holding interval among the holding intervals that continues from the first exposure interval and a second count value counted in the second exposure interval in the second pixel.

2. The photoelectric conversion apparatus according to claim 1, further comprising a detection circuit configured to detect the change based on the difference value.

3. The photoelectric conversion apparatus according to claim 2, further comprising:
   a readout circuit configured to read out a signal outputted from the plurality of pixels; and
   a switching circuit connected to the counter and the processing circuit, and configured to switch output of the counter and output of the processing circuit to be outputted to the readout circuit, wherein
   the readout circuit has a function of the detection circuit.

4. The photoelectric conversion apparatus according to claim 1, wherein
   the counter includes a flip-flop circuit, and
   the processing circuit includes an exclusive OR circuit configured to obtain an exclusive OR for each digit between the first count value, which is held in the flip-flop circuit of the first pixel, and the second count value, which is held in the flip-flop circuit of the second pixel.

5. The photoelectric conversion apparatus according to claim 1, wherein a length of the first exposure interval and a length of the second exposure interval are the same.

6. The photoelectric conversion apparatus according to claim 1, wherein the first exposure interval and the second exposure interval partially overlap.

7. The photoelectric conversion apparatus according to claim 1, wherein the first exposure interval and the second exposure interval do not overlap.

8. The photoelectric conversion apparatus according to claim 1, wherein the first pixel and the second pixel are disposed so as to be adjacent to each other in the plurality of pixels.

9. The photoelectric conversion apparatus according to claim 1, wherein
   the plurality of pixels further comprise a third pixel, and
   in the interval for detecting the change,
   in the third pixel, the detection operation is repeated and after a predetermined time has elapsed from the start of the second exposure interval, a third exposure interval among the exposure intervals of the third pixel is started, and
   the processing circuit further outputs a difference value between the first count value or the second count value and a third count value counted in the third exposure interval in the third pixel.

10. The photoelectric conversion apparatus according to claim 9, wherein
    the plurality of pixels further comprise a fourth pixel, and
    in the interval for detecting the change,
    in the fourth pixel, the detection operation is repeated and after a predetermined time has elapsed from the start of the third exposure interval, a fourth exposure interval in the exposure interval of the fourth pixel is started, and the processing circuit further outputs a difference value between the first count value, the second count value, or the third count value and a fourth count value counted in the fourth exposure interval in the fourth pixel.

11. The photoelectric conversion apparatus according to claim 1, wherein the counter is reset in accordance with the start of the exposure interval.

12. A device comprising:
   the photoelectric conversion apparatus according to claim 1; and
   a processing apparatus configured to process a signal outputted from the photoelectric conversion apparatus.

13. A moving body in which the photoelectric conversion apparatus according to claim 1 is provided, the moving body comprising:
   a control apparatus configured to control movement of the moving body by using a signal that the photoelectric conversion apparatus outputs.

* * * * *